United States Patent [19]
Citta et al.

[11] Patent Number: 5,416,524
[45] Date of Patent: May 16, 1995

[54] DIGITAL TELEVISION SYNCHRONIZATION SYSTEM AND METHOD

[75] Inventors: Richard W. Citta, Oak Park; Dennis M. Mutzabaugh; Gary J. Sgrignoli, both of Mt. Prospect, all of Ill.

[73] Assignee: Zenith Electronics Corp., Glenview, Ill.

[21] Appl. No.: 894,388

[22] Filed: Jun. 5, 1992

Related U.S. Application Data

[63] Continuation-in-part of Ser. No. 763,848, Sep. 23, 1991, abandoned, which is a continuation-in-part of Ser. No. 732,369, Jul. 18, 1991, abandoned.

[51] Int. Cl.$^6$ .............................................. H04N 7/24
[52] U.S. Cl. .................... 348/471; 348/495; 348/537; 348/528; 348/682
[58] Field of Search ............................ 375/17, 20, 113; 358/86, 141, 13, 148; 348/495, 528, 536, 682, 537, 471, 472; H04N 7/13, 5/04, 5/06, 5/067, 7/00

[56] References Cited

U.S. PATENT DOCUMENTS
4,989,219  1/1991  Gerdes et al. ..................... 375/17

FOREIGN PATENT DOCUMENTS
0015387  1/1984  Japan ............................... 358/86

*Primary Examiner*—James J. Groody
*Assistant Examiner*—David F. Harvey

[57] ABSTRACT

A digital television signal includes data sent as multi-level symbols in successive data segments each including a synchronizing sync character. The detected synchronizing sync character produces a characteristic having two opposite polarity levels separated by a zero reference level, with the levels occurring at successive sampling points of the television signal, and a detection signal that has a peak occurring in time coincidence with the zero reference level. The detection signal controls sampling of the received television signal. The gain of the received signal is controlled by an AGC circuit that also responds to the detection signal.

72 Claims, 6 Drawing Sheets

DIGITAL TELEVISION SYNCHRONIZATION SYSTEM AND METHOD

CROSS REFERENCE TO RELATED APPLICATIONS

This is a continuation-in-part of application Ser. No. 763,848, filed Sep. 23, 1991 (now abandoned), which is a continuation-in-part of application Ser. No. 732,369, filed Jul. 18, 1991, now abandoned.

BACKGROUND OF THE INVENTION AND PRIOR ART

This invention relates generally to digital television systems and specifically to a digital television system including a synchronizing signal character that facilitates the reception and processing of television signal-related data.

Video signals in digital television signal transmission and reception systems may take many forms. Because of the digitized nature of the transmission, the synchronizing or timing signals should be robust, i.e. relatively noise insensitive, and yet not require an inordinate amount of data space. In Zenith Electronics Corporation's proposed high definition digital television signal transmission system, data is sent in the form of multi-level symbols. For timing purposes, the video information is transmitted in the form of successive data segments, each accompanied by a specifically formatted synchronizing signal character. Each data segment includes 684 symbols and the symbol rate is 10.7 megasymbols per second. While the repetitive data segments are transmitted at the rate of NTSC video lines, the data segments bear no correlation with displayed video lines on a cathode ray tube or other display device. The timing or synchronizing signal character occupies a fixed position in each data segment, such that repetitive data segments, when added together, tend to reinforce the synchronizing signal character, whereas the video information, which is random in nature, is not reinforced. Consequently, the synchronizing signal character may be easily detected with a high degree of accuracy without requiring excessive data space. In the invention, the synchronizing signal character and the translation channels through which it is processed, produce a processed synchronizing signal character that has a pair of opposite polarity levels separated by a zero reference level, with the levels occurring at successive sampling points in the television signal, and a detection signal characterized by a peak amplitude at the zero reference level.

In the preferred embodiment, the synchronizing signal character is formatted such that any DC offsets imposed at the transmitter or acquired during transmission or reception may be conveniently removed in a receiver.

The digital nature of the transmission and the fact that the video data is sampled in response to the timing character imposes more stringent requirements in that the timing relationship between the synchronizing signal character and the video data must be accurately preserved. In accordance with another aspect of the invention, the spectral characteristic of the synchronizing signal character is "matched" to that of the video data so that distortions in the transmission channel affect the zero crossing points in the same way to preserve this important timing relationship.

OBJECTS OF THE INVENTION

A principal object of the invention is to provide a novel digital television signal translation system and method.

Another object of the invention is to provide an improved method of transmitting and receiving digital video-related data.

A further object of the invention is to provide a robust digital television transmission system and reception system and synchronizing signal characters for use therewith.

BRIEF DESCRIPTION OF THE DRAWINGS

These and other objects and advantages of the invention will be apparent upon reading the following description in conjunction with the drawings, in which:

FIGS. 8A' and 8B' illustrate the impulse response of filters 142 and 144, respectively, of the receiver of FIG. 6 for the preferred form of synchronizing signal character of FIG. 7A;

DESCRIPTION OF THE PREFERRED EMBODIMENT

Figure 1:
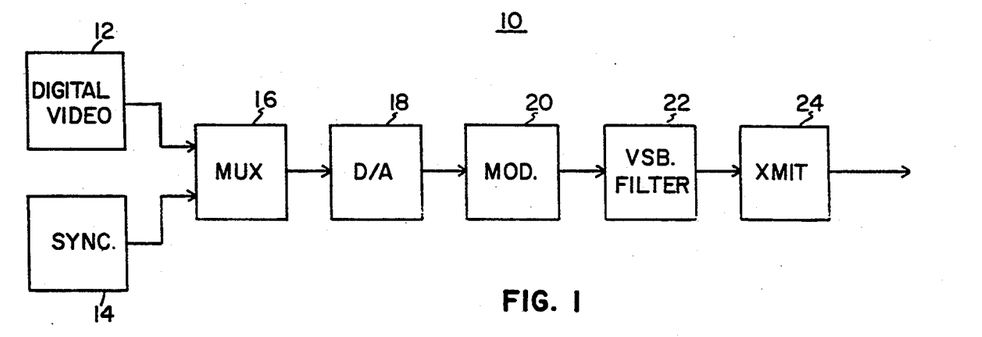
FIG. 1 is a simplified block diagram of a digital television signal transmitter constructed in accordance with the invention.

Referring to FIG. 1, a transmitter constructed in accordance with the invention is generally indicated by the reference numeral 10. A source of digital video signal 12 and a source of synchronizing signal 14 are coupled to a multiplexer 16 which multiplexes the information from the two sources and provides a single output, comprising a stream of multi level symbols. The video data signal preferably comprises a combination of four and two-level symbols. The two levels may be a subset of the four levels, which are generated at a rate of about 10.7 megasymbols per second and formatted into repetitive data segments of 684 symbols each. Alternatively, and in accordance with the preferred embodiment, the two levels comprise levels intermediate the two lower and two upper levels of the four-level symbols. As will be described in further detail, a predetermined synchronizing signal character is provided by source 14 and inserted in a fixed position in each data segment. The output of multiplexer 16 is coupled to a digital-to-analog (D/A) converter 18, which converts the digital information from the multiplexer 16 to analog form and supplies it to a modulator 20 where it is used to modulate an RF carrier. The modulator output is processed through a vestigial sideband (VSB) filter 22 and applied to a transmitter 24. The resultant output of the transmitter represents the multilevel digital data signal bandwidth limited for transmission through a conventional 6 MHz television channel.

Figure 2:
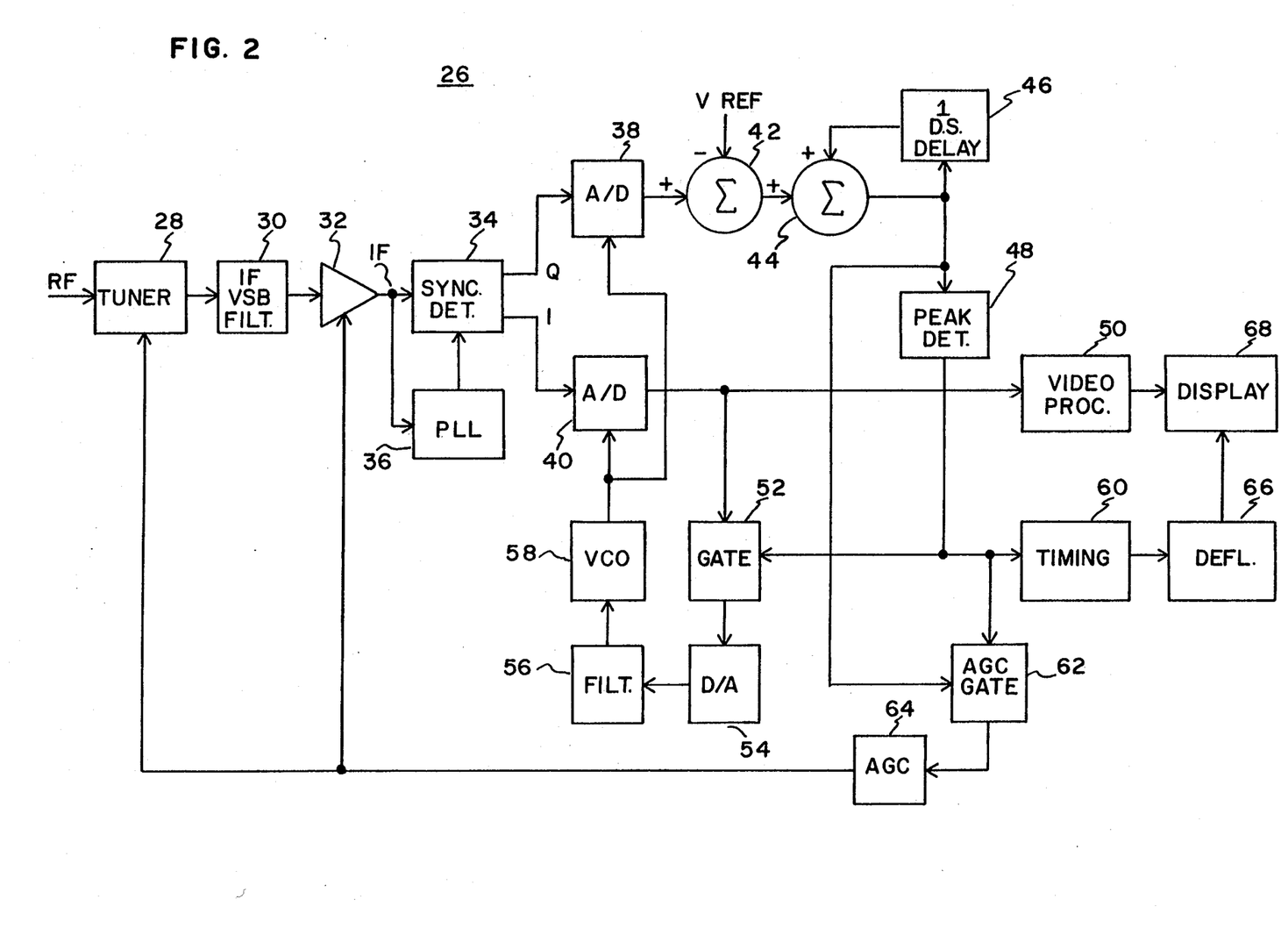
FIG. 2 is a simplified block diagram of a digital television signal receiver constructed in accordance with one form of the invention.

In FIG. 2, the RF signal from transmitter 24 is received by a tuner 28 for conventional processing to develop an IF frequency signal, which is supplied to an IF VSB filter 30. The output of filter 30 is supplied to a gain controllable IF amplifier 32 which in turn supplies a synchronous detector 34 and a phase locked loop (PLL) 36. PLL 36 is coupled to synchronous detector 34 and synchronous detection of the IF signal occurs in a well known manner to produce two outputs that are substantially 90 degrees apart. One output is labelled I, for in-phase, and the other is labelled Q, for quadrature phase. (These I and Q notations are not to be confused with the well known I and Q color signals—I and Q, as used herein, merely denote that the two signals are displaced by 90 degrees.)

It should be noted that the I and Q signals are very specific representations, produced in a VSB system, which are used to process the predetermined synchronizing signal character to develop respective outputs that may be used for synchronization and control purposes. As will be seen, in a very broad sense filters may be used to complement a specifically formatted synchronizing signal character to achieve the desired outputs.

The Q signal and the I signal are applied to respective analog-to-digital (A/D) converters 38 and 40. The output of A/D converter 40, i.e. the digital I signal, is applied to a video processor 50 and to a gate 52. The output of A/D converter 38, i.e. the digital Q signal, is applied to an adder 42 which is also supplied with a reference voltage input, labelled Vref, in a subtractive relationship. Adder 42 supplies another adder 44. A delay circuit 46, a peak detector 48 and an AGC gate 62 each receive the output of adder 44. Delay circuit 46 introduces a one-data-segment delay and supplies the delayed signal back to adder 44. As will be seen, the effect of adder 44 and delay circuit 46 and the formatting of the data segments results in reinforcement of the synchronizing signal character in successive data segments. The randomly occurring video information, on the other hand, is not reinforced by adding successive data segments. Therefore a peaked signal, representing the location of the synchronizing signal character, is developed in the Q channel of the receiver.

The peaked signal is detected in peak detector 48, the output of which is coupled to gate 52, to a timing circuit 60 and to AGC gate 62. The output of peak detector 48 provides a trigger voltage to gates 52 and 62 and keys timing circuit 60 in synchronism with the synchronizing signal character. AGC gate 62 is coupled to an AGC circuit 64 which operates conventionally to control the gains of tuner 28 and IF amplifier 32 as a function of the received television signal strength (as determined by the magnitude of the signal in the Q channel). Timing circuit 60 generates timing signals that are applied to a conventional deflection circuit 66 that, in turn, is used to control a display 68, which may be a conventional cathode ray tube (CRT).

Gate 52 couples the I channel signal from A/D 40 to another phase locked loop which includes a D/A converter 54, a loop filter 56 and a voltage controlled oscillator (VCO) 58. The output of VCO 58 controls both A/D converters 38 and 40 and thus the sampling of the I and Q channels.

Figure 3:
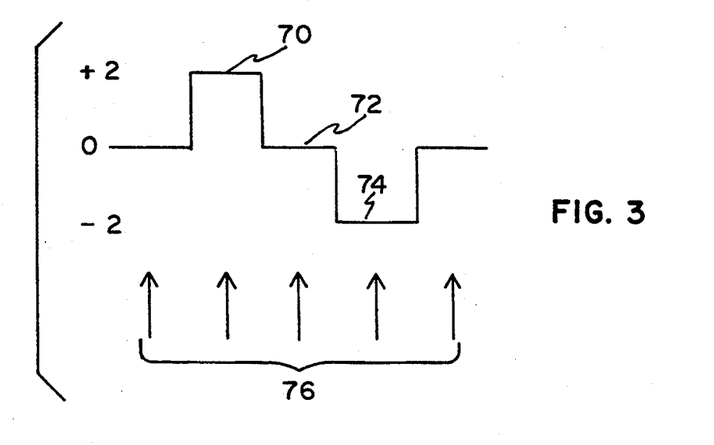
FIG. 3 is a waveform of the synchronizing signal character used with the receiver of FIG. 2.

In FIG. 3, the synchronizing signal character used in this embodiment of the invention is shown. The group of symbols includes three equal duration levels 70, 72 and 74, with level 70 being high, level 74 low and level 72 intermediate. Preferably the intermediate level is zero, but any reference level may be used with suitable (and obvious) changes to the relevant circuitry. As indicated, the 10.7 megasymbol sampling points 76 (characterizing the output of multiplexer 16 of transmitter 10 in FIG. 1) represent each of the three levels of the synchronizing signal character. In the receiver, the sampling points are determined by A/D converters 38 and 40 which are adjusted, for synchronization purposes, by PLL-controlled VCO 58. Thus VCO 58 functions to adjust the sampling rate of the A/D converters in accordance with detection of the synchronizing signal character in the received and translated or filtered television signal. In particular, VCO 58 is controlled for sampling the zero level of the synchronizing signal character at its center point to establish proper timing for sampling the remainder of the received signal. It will be understood that the term translated includes filtering as well as amplification and the like.

Figure 4:
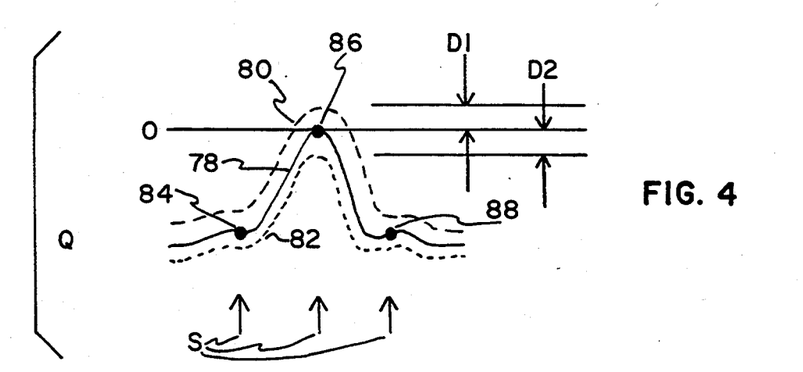
FIG. 4 illustrates curves associated with the output of the Q channel for detecting the zero level of the synchronizing signal character.
Figure 5:
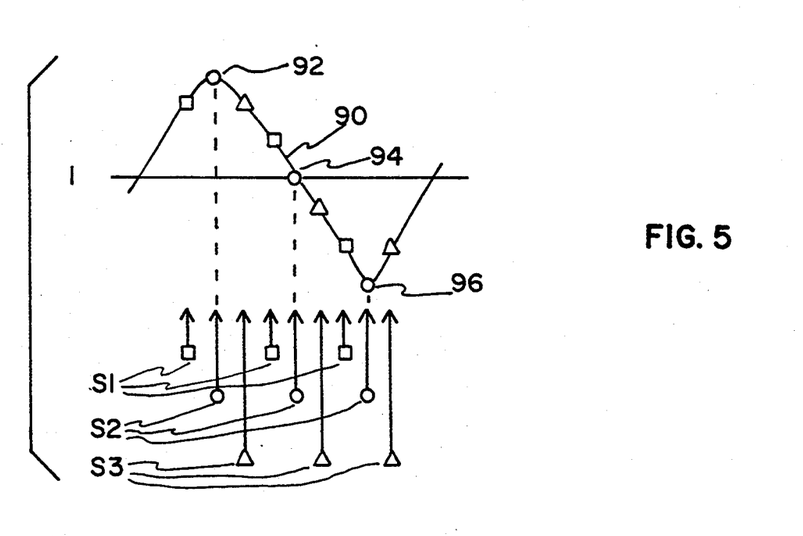
FIG. 5 illustrates the effective response characteristic of the I channel.

In FIGS. 4 and 5, the quadrature related outputs of the Q and I channels are shown. FIG. 4 represents the waveform in the Q channel produced at the output of adder 44. This waveform results from the repetitive addition of successive data segments, each of which includes a synchronizing signal character (as shown in FIG. 3) at a fixed position in the data segment. The result is that the Q channel generates a peaked waveform with the three points 84, 86 and 88 corresponding to the sampling points of the levels 70, 72 and 74, respectively, of the synchronizing signal character of FIG. 3. Solid line curve 78 illustrates the output of adder 44 when the received television signal is properly synchronized and the AGC voltage is correct. Point 86 corresponds to the proper sampling point of the intermediate (reference or zero) level of the synchronizing signal character. Dashed line curve 80 represents the output of adder 44 when the signal strength of the received television signal is too high and the dotted line curve 82 when the received signal strength is too low. The difference D1 or D2, between actual zero and the zero level point 86, is communicated to AGC circuit 64 via gate 62 for developing an AGC control voltage to bring point 86 to the actual zero (or reference) level. It will be appreciated that reference voltage Vref is a digital number that is selected to establish the nominal level of this AGC voltage. As will be explained in greater detail below, the application of the I channel signal to the phase locked loop, including VCO 58, during the gating period determined by gate 52 (corresponding to the central portion of the zero level of the synchronizing signal character), enables the system to "lock up" as a conventional discriminator.

In FIG. 5, the output of the I channel (A/D converter 40) is in the form of a conventional discriminator curve 90 with positive and negative maximums 92 and 96 and a zero crossing point 94. The shape of the discriminator curve is determined by the selected synchronizing signal character and the translation or filtering of the transmitter and receiver which together produce a composite filter characteristic. The I channel output of A/D converter 40 is sampled via gate 52 under control of the Q channel output of peak detector 48. The digital value determined at that point in the I channel is converted to an analog value by D/A converter 54, filtered by filter 56 and used to control VCO 58 for adjusting the sampling rate of A/D converter 40 (and of A/D converter 38). The circled points 92, 94 and 96 on discriminator curve 90 illustrate the condition when the sampling points (S2) occur at the correct phase and correspond to points 84, 86 and 88 of FIG. 4. The squares on curve 90 illustrate the condition when the sampling points (S1) are too early in phase and the loop responds by adjusting the frequency of VCO 58 until the condition illustrated by points (S2) results. Similarly the triangles illustrate the condition where sampling is too late in phase, which results in a corresponding adjustment in the frequency of VCO 58. In this manner, the phase locked loop synchronizes the VCO-controlled A/D converters 38 and 40 with the received television signal. The criterion is to have three consecutive sampling points cover the three levels of the synchronizing signal character.

Figure 6:
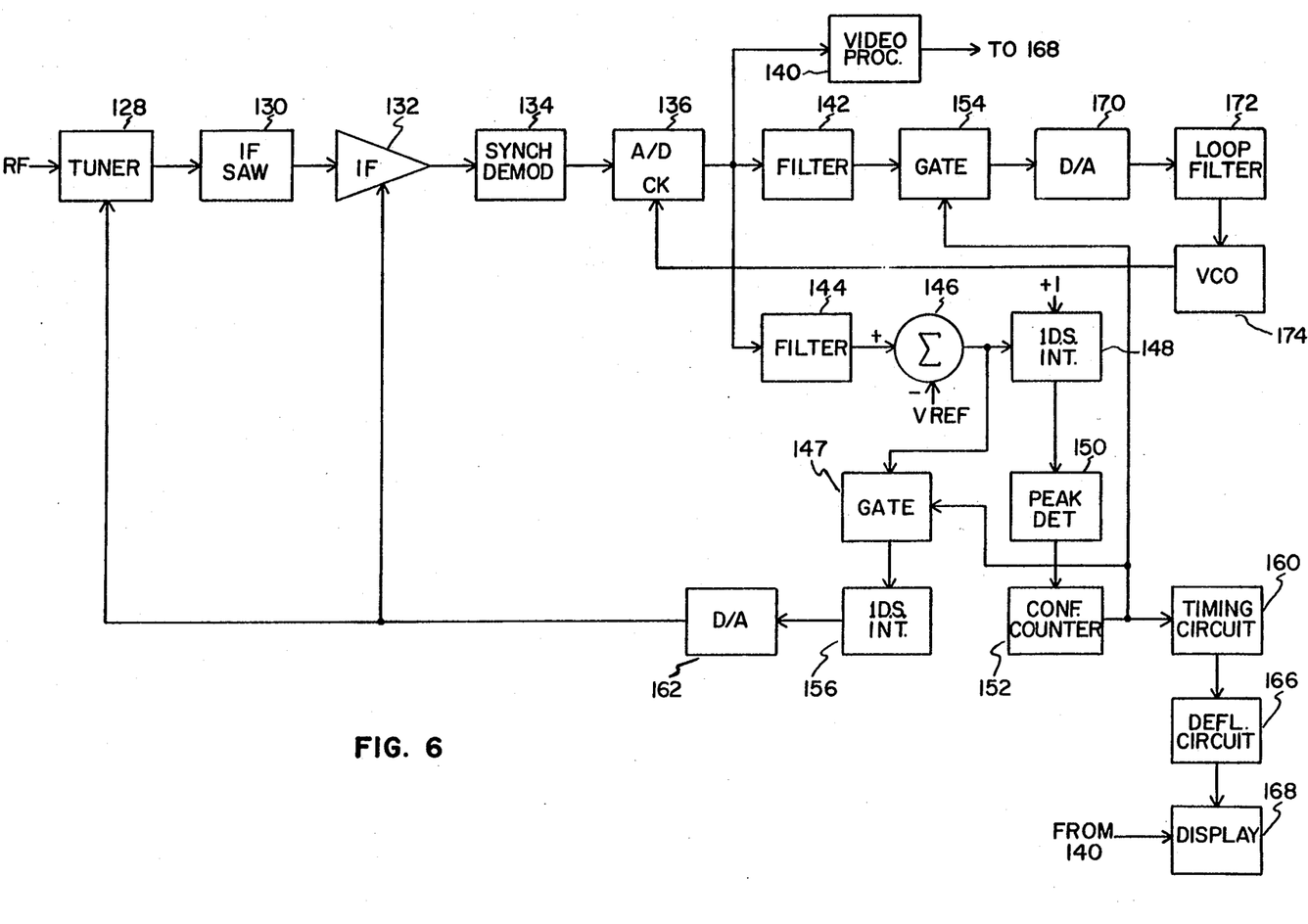
FIG. 6 is a simplified block diagram of a digital television signal receiver constructed in accordance with the preferred embodiment of the invention.

In FIG. 6, the RF signal from transmitter 24 is received by a tuner 128 for conventional processing to produce an IF frequency signal, which is supplied to an IF filter 130. Those skilled in the art will recognize that the preferred "filter" system does not require single sideband (or VSB) transmission (and hence there is no need for a VSB filter in the receiver). The output of filter 130 is supplied to a gain controllable IF amplifier 132 which in turn supplies a synchronous demodulator 134. Synchronous demodulation of the IF signal occurs in a well known manner to produce an in-phase baseband output corresponding to the signal produced at the output of D/A converter 18 of FIG. 1. The output of synchronous demodulation 134 is applied to an analog-to-digital (A/D) converter 136 which is responsive to a clock signal for providing a sampled representation of the input demodulated signal. The output of A/D converter 136, i.e. the sampled demodulated signal, is applied to a video processor 140, a first filter 142 and a second filter 144. The output of filter 144 is applied to a summer 146 which is also supplied with a reference voltage input, labelled Vref, in a subtractive relationship. Summer 146 supplies a gate 147 and a first one data segment integrator 148, whose output is incremented by one, and coupled to a peak detector 150. The effect of integrator 148 is to reinforce the synchronizing signal character in successive data segments for providing a peaked signal representing the location of the center of the synchronizing signal characters in the received data segments.

The peaked signal is detected in peak detector 150, whose output is applied to a confidence counter 152. The output of confidence counter 152 comprises a timing signal which is generated in synchronism with the received synchronizing signal character and which is supplied to gate 147, a gate 154, and a timing circuit 160. The output of gate 147 is coupled to a second one data segment integrator 156, the output of which is coupled by a D/A converter 162 to IF amplifier 132 and tuner 128 for controlling their gains. Timing circuit 160 generates the timing signals which are applied to a conventional deflection circuit 66 for controlling a CRT display 168.

Gate 154, in response to the output of confidence counter 152, which comprises a relatively narrow pulse nominally occurring in time coincidence with the center of each filtered synchronizing signal character, couples the output of filter 142 to a phase locked loop which includes a D/A converter 170, a loop filter 172 and a VCO 174. The output of VCO 174 is applied to the clock input of A/D converter 136 for controlling the sampling of the demodulated signal supplied by synchronous demodulator 134.

Figures 7, 7A:
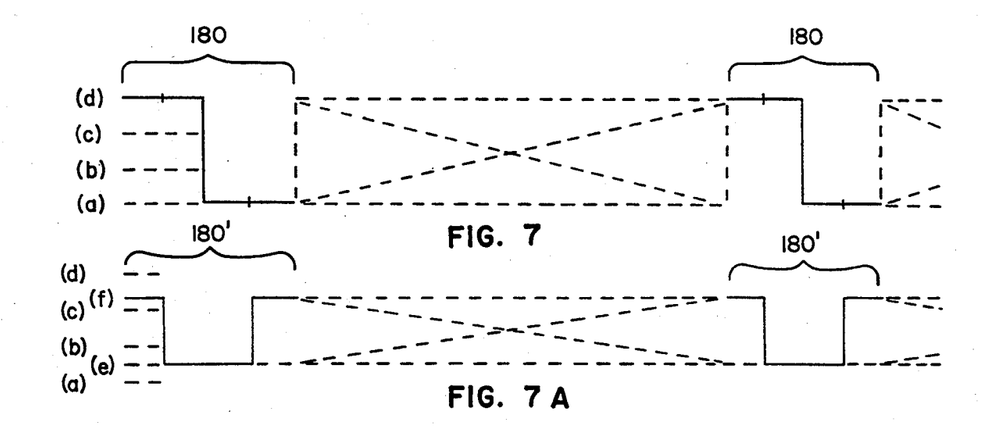
FIG. 7 is a waveform illustrating a data segment including one form of associated synchronizing signal character.
FIG. 7A is a waveform illustrating a data segment, including a preferred form of associated synchronizing signal character.

FIG. 7 represents the output of multiplexer 16 of FIG. 1 which comprises a plurality of repetitive data segments, each including a synchronizing signal character 180. As mentioned previously, each data segment comprises 684 two or four-level symbols occurring at a rate of about 10.7 megasymbols per second. In this embodiment of the invention, each synchronizing signal character 180 comprises at least four successive symbols, the first two symbols, for example, occurring at the maximum level (d) and the last two symbols at the minimum level (a). Selecting the outermost levels (a) and (d) to define the synchronizing signal character provides a very robust timing reference which is highly insensitive to noise. Furthermore, assuming that level (b) represents zero carrier, each synchronizing signal character 180 will be characterized by a small DC offset, which allows for improved receiver performance; especially AFC acquisition and synchronous demodulator operation. Alternatively, the first and last symbols of the synchronizing signal character may occur at the minimum level (a), with the middle two symbols occurring at the maximum level (d).

A preferred form of synchronizing signal character 180' is shown in FIG. 7A. It too consists of four successive symbols, with the first and last symbols occurring at a level (f), that is intermediate levels (c) and (d) and the two intermediate symbols occurring at level (e), that is intermediate levels (a) and (b). The use of levels (e) and (f) rather than the outermost levels (a) and (d) has advantages in reduced transmission power and reduced interference into a nearby co-channel signal. Advantageously, the two-level ones of the two or four-level data symbols are also at levels (e) and (f) along with the two-level symbols of the synchronizing signal character. The arrangement simplifies the receiver processing circuitry.

Figure 9A:
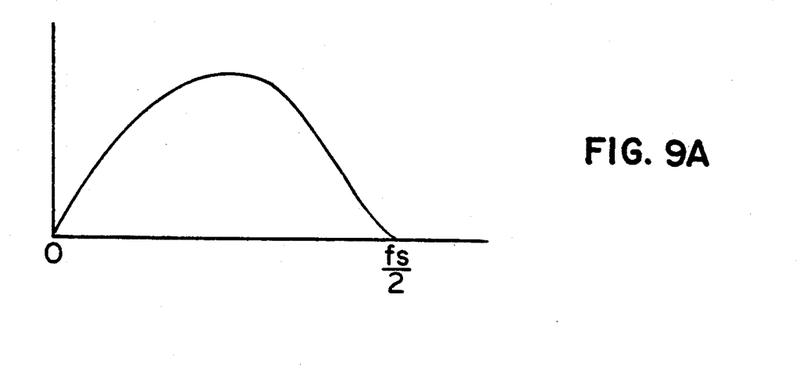
FIGS. 9A and 9B illustrate the frequency responses of filters 142 and 144, respectively, of the receiver of FIG. 6.
Figure 9B:
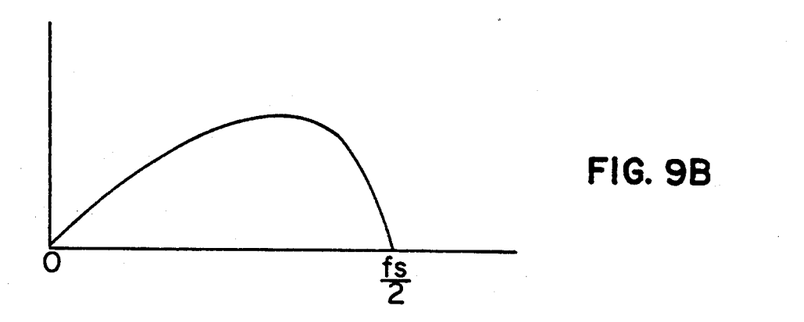

A signal very similar to either of those shown in FIGS. 7 and 7A [with synchronizing signal character 180 assuming the outermost levels (a) and (d) or synchronizing signal character 180' assuming the intermediate levels (e) and (f)] also appears at the output of synchronous demodulator 134 of the receiver of FIG. 6, except that additional DC offsets may have been introduced into the synchronizing signal character during transmission and reception. Such additional DC offsets may result, for example, from the introduction of multipath ghosts of the video-related data into the synchronizing character, especially in systems that employ a pilot form of transmission. It is desirable to remove all such DC offsets from the received signal following demodulation by synchronous demodulator 134. Accordingly, the sampled demodulated signal provided by A/D converter 136 is applied to filters 142 and 144, which preferably comprise respective 4-tap digital filters having frequency response characteristics as illustrated in FIGS. 9A and 9B, respectively. It will be observed that each filter 142 and 144 has a zero response at DC as well as at fs/2, where fs is the data sampling rate.

Figure 8A:
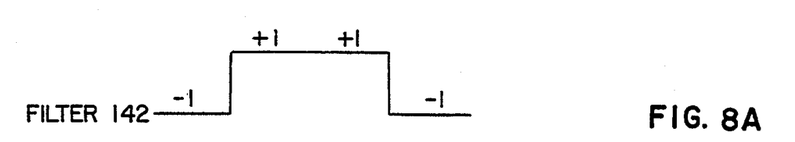
FIGS. 8A and 8B illustrate the impulse response of filters 142 and 144, respectively, of the receiver of FIG. 6 for the synchronizing signal character of FIG. 7.
Figure 8B:
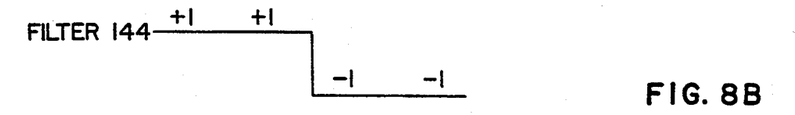
Figure 8C:
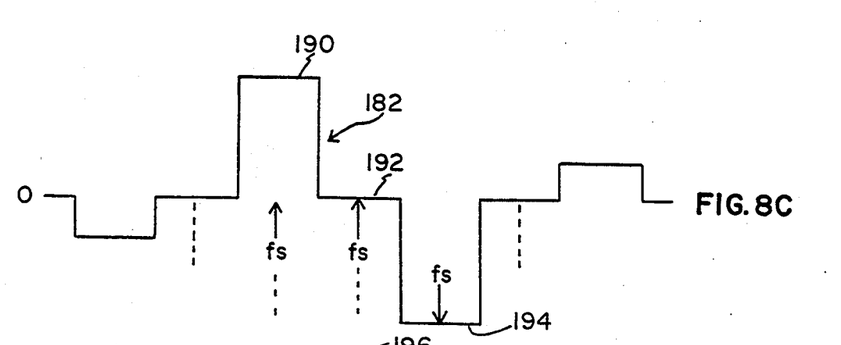
FIGS. 8C and 8D illustrate the respective outputs of filters 142 and 144 in response to the received synchronizing signal characters of FIG. 7 and FIG. 7A.
Figure 8D:
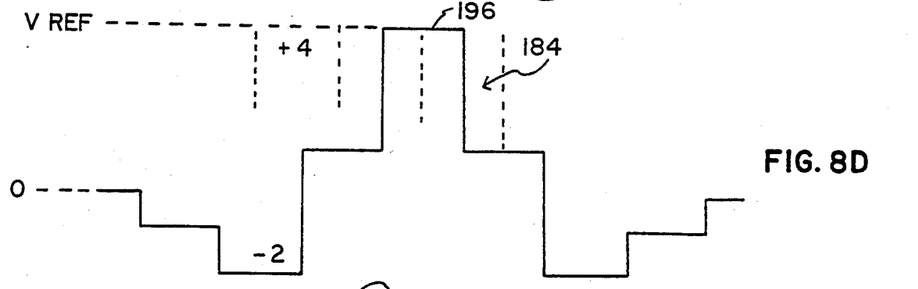

The impulse responses of filter 142 are illustrated in FIGS. 8A and 8A' for the synchronizing signal characters of FIGS. 7 and 7A, respectively. Similarly, the impulse responses of filter 144 for the synchronizing signal characters of FIGS. 7 and 7A are illustrated in FIGS. 8B and 8B', respectively. The impulse response of filter 142 is selected for converting the received synchronizing character to an output signal resembling a conventional discriminator curve while the impulse response of filter 133 is correlated with the synchronizing character to provide a peaked output in synchronism therewith. Thus, referring to FIGS. 8C and 8D, waveform 182 of FIG. 8C represents the output of filter 142 in response to the sampled synchronizing character 180 (or the output of filter 142 in response to the sampled synchronizing signal character 180') and will be seen to be generally in the shape of a discriminator curve while the waveform 184 of FIG. 8D represents the output of filter 144 in response to the sampled synchronizing character 180 (or of sampled synchronizing signal character 180') and includes a peaked level 196 locating the center of the synchronizing character. In the cases of synchronizing characters with the first and last symbols occurring at level (a) or the intermediate level (e) and the middle two symbols at level (d) or at intermediate level (f), the response of filters 142 and 144 may be interchanged to provide the same outputs depicted in FIGS. 8C and 8D. To sum up, the filter characteristics are selected to produce the FIGS. 8C and 8D outputs when subjected to the selected synchronizing signal characters.

Referring back to FIG. 8C, waveform 182 includes three successive equal duration levels 190, 192 and 194, with level 190 being high, level 194 low and level 192 intermediate. Preferably, the intermediate level is zero. Waveform 182 is seen to be similar to the synchronizing signal character in FIG. 3. As indicated, the nominal 10.7 megasymbol successive sampling points fs represent each of the three levels of the filtered synchronizing signal character. The sampling points fs are determined by the clock signal applied to A/D converter 136. PLL-controlled VCO 174 functions to adjust the sampling rate of A/D converter 136 in accordance with detection of the synchronizing signal character in the received and filtered television signal. In particular, VCO 174 is controlled for sampling the zero level of the synchronizing signal character at its center point to establish proper timing for sampling the remainder of the received signal.

Figure 8E:
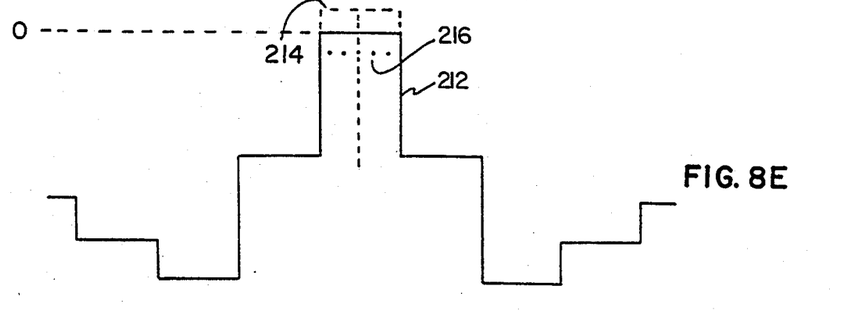
FIG. 8E illustrates the output of summer 146 in response to the received synchronizing signal character of FIG. 7 and FIG. 7A.
Figure 9C:
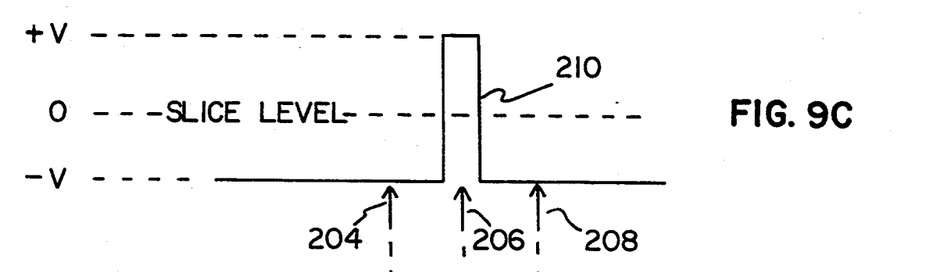
FIG. 9C illustrates the output of integrator 148 of the receiver of FIG. 6.

More specifically, FIG. 9C represents the output of integrator 148. This waveform results from the repetitive addition of waveform 184 (offset by subtraction of Vref) incremented by a factor of one. Its general similarity to the waveform of FIG. 4 should be noted. The result is that integrator 148 generates a peaked waveform 210 with the three points 204, 206 and 208 corresponding to the sampling points of the levels 190, 192 and 194, respectively, of the output of filter 142. This waveform is sliced at the indicated level by peak detector 150 and coupled to confidence counter 152 which, after counting a predetermined number of input pulses, develops an output timing signal at the synchronizing signal character rate for triggering gates 147 and 154 and for operating the timing circuit 160. FIG. 8E represents the output of summer 146, i.e. waveform 184 reduced by Vref. Solid line curve 212 illustrates the output of summer 146 when the received television signal is properly synchronized and the AGC voltage is correct. Dashed line curve 214 represents the output of summer 146 when the signal strength of the received television signal is too high and the dotted line curve 216 when the received signal strength is too low. Gate 147 is triggered by the timing signal generated by confidence counter 152 for coupling samples of the difference between the actual level and the reference level to integrator 156. Integrator 156 accumulates these samples for developing an AGC control voltage to maintain the nominal or reference level established by Vref. As mentioned previously, reference voltage Vref is a digital number that is selected to establish a desired nominal level of baseband digital data.

Figure 9D:
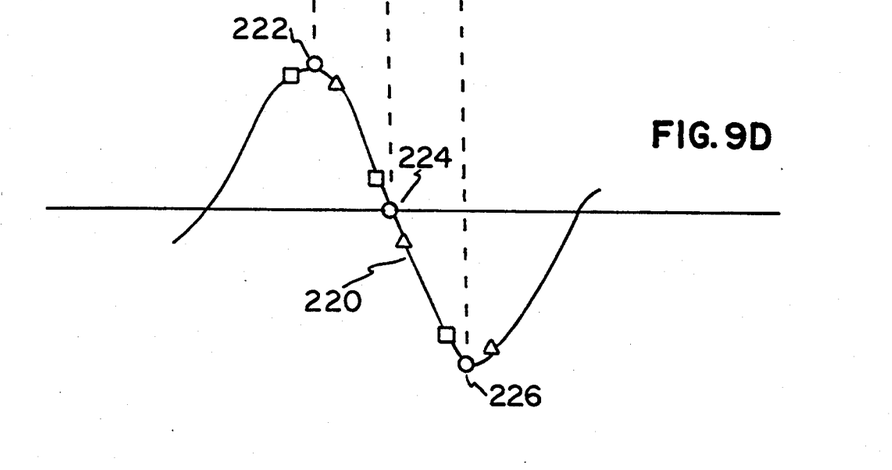
FIG. 9D illustrates a discriminator curve similar to that of FIG. 5 and useful in explaining the operation of the data sampling system of the receiver of FIG. 6.

In FIG. 9D, the output of filter 142 is illustrated in the form of a conventional discriminator curve 220 with positive and negative maximums 222 and 226 and a zero crossing point 224. As discussed above, the shape of the discriminator curve is determined by the selected synchronizing signal character, and by the channel filtering in the transmitter and receiver, including filter 142. Note the similarity to curve 90 of FIG. 5, which was determined by a completely different synchronizing signal character and processing channel. The output of filter 142 is sampled via gate 154 under control of confidence counter 152, i.e. in time coincidence with point 206 of waveform 210. The sampled digital value of the output of filter 142 is converted to an analog value by D/A converter 170, filtered by filter 172 and used to control VCO 174 for adjusting the sampling rate of A/D converter 136. The circles 222, 224 and 226 on discriminator curve 220 illustrate the condition when the sampling points occur at the correct phase and correspond to points 204, 206 and 208 of FIG. 9C. The squares on curve 220 illustrate the condition when the sampling points are too early in phase and the loop responds by adjusting the frequency of VCO 174 until the condition illustrated by circles 222, 224 and 226 results. Similarly, the triangles illustrate the condition where sampling is too late in phase, which results in a corresponding adjustment in the frequency of VCO 174. In this manner, the phase locked loop synchronizes the VCO-controlled A/D converter 136 with the received television signal.

Figure 10:
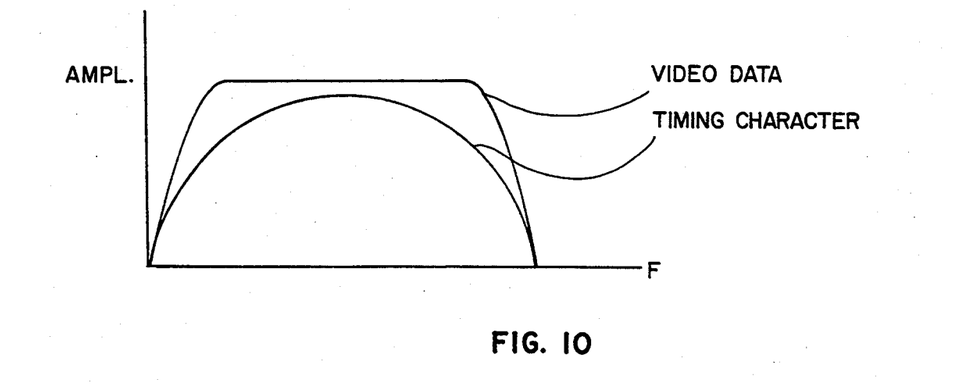
FIG. 10 shows a generalized spectral characteristic for the synchronizing signal character and the video data.

As mentioned previously, the timing relationship between the synchronizing signal character and the video data is critical. Care should be taken to assure that distortions in the signal transmission channel, such as channel tilt, do not adversely affect this timing relationship. The invention also teaches selecting a synchronizing signal character that has a spectral characteristic that substantially matches the spectral characteristic of the video data so that channel distortions affect the recovery of the synchronizing signal character and video data in the same way, i.e. result in approximately the same degree of displacement in their zero crossing points. With this characteristic, the timing relationship will be preserved even if channel distortions are present. This is illustrated in FIG. 10 where the spectral characteristics of the synchronizing signal character and the video data are seen to "match" fairly well.

In summary, in one embodiment, the synchronizing signal character received and processed by the receiver is applied to I and Q channels, which, with the synchronizing signal character itself, produce a discriminator-like output and a detection signal. The outputs of the channels are used to effect timing and gain control of the received signal. The filter embodiment of the invention is preferred and yields the benefit of zero response to DC, as well as simplicity. The synchronizing signal character is found because of its repetitive nature in the recurring data segments as compared with the random nature of the video information, which causes it to be reinforced by the addition of successive data segments. The system is relatively simple in operation and the synchronizing signal character does not require excessive data space. The "matching" of the spectral characteristic of the synchronizing signal character and the video data retains the timing relationship despite channel distortions.

Those skilled in the art will readily perceive changes in the described embodiments that do not depart from the spirit and scope of the invention. The invention is to be limited only as defined by the claims.

What is claimed is:

1. A method of transmitting and receiving a digital television signal comprising:
   transmitting a television signal having a plurality of data segments of multilevel symbols at a fixed rate, each data segment including a synchronizing signal character having predetermined characteristics;
   receiving and detecting said television signal;
   sampling said received and detected television signal for developing a discriminator response characteristic and a detection signal from said synchronizing signal character; and
   controlling said sampling in response to said discriminator response characteristic and said detection signal.

2. The method of claim 1 wherein said discriminator response characteristic has a pair of opposite polarity levels with a zero crossing corresponding to sampling points of the transmitted television signal and wherein said detection signal has a peak magnitude at said zero crossing of said response characteristic.

3. The method of claim 2 comprising formatting said television signal into said plurality of said data segments with said synchronizing signal character occurring in the same relative position in each of said data segments; and
   processing said data segments to reinforce the synchronizing signal character in successive data segments.

4. The method of claim 2 wherein said sampling includes filtering said sampled television signal for developing said detection signal.

5. The method of claim 4 wherein said sampling further includes filtering said sampled television signal for developing said response characteristic.

6. The method of claim 3 wherein said detecting develops two substantially quadrature signals prior to said sampling for developing said detection signal and said discriminator response characteristic.

7. The method of claim 6, further including using a phase locked loop to control sampling of said television signal.

8. The method of claim 6, further including:
   developing said detection signal from one of said two substantially quadrature signals; and
   using said detection signal to adjust sampling of both said two substantially quadrature signals.

9. The method of claim 8, further including using said detection signal to gate a phase locked loop for controlling sampling of said two substantially quadrature signals.

10. The method of claim 8 wherein said pair of opposite polarity levels and said zero crossing define high, low and intermediate levels of equal duration.

11. The method of claim 1, further comprising using said detection signal to control the amplitude of said received and detected television signal.

12. The method of claim 3 wherein said opposite polarity levels and said zero crossing define three levels, one above and one below a reference level, said sampling being selected such that said three levels correspond to successive sampling points of said television signal.

13. The method of claim 12 wherein said detecting develops two substantially quadrature signals prior to said sampling, and further comprising:
   developing said detection signal from one of said two substantially quadrature signals; and
   using said detection signal for controlling the sampling of said two substantially quadrature signals.

14. The method of claim 13 further comprising using said detection signal to control the amplitude of said received and detected television signal.

15. A television signal receiver comprising:
   means for receiving and detecting a transmitted digital television signal having repetitive data segments, each including a synchronizing signal character;
   means for sampling said received and detected television signal for developing a processed synchronizing signal character having respective high, intermediate and low levels at successive sampling points of said television signal, and for generating a detection signal identifying the occurrence of said intermediate level; and
   means responsive to said processed synchronizing signal character and said detection signal for adjusting the sampling rate of said sampling means for maintaining said intermediate level at a selected reference level.

16. The receiver of claim 15 wherein said synchronizing signal character occurs in the same relative position in each of said data segments; and
   means for adding successive data segments for developing said detection signal.

17. The receiver of claim 16, further including means responsive to said detection signal for controlling the amplitude of said received and detected television signal.

18. The receiver of claim 17 wherein said high, intermediate and log levels are of substantially equal duration.

19. The receiver of claim 18 wherein said detecting means develop two substantially quadrature signals and wherein said sampling means samples each of said quadrature signals to develop said detection signal and said processed synchronizing signal character, respectively, and further including:
a phase locked loop for receiving said processed synchronizing signal character; and
said phase locked loop being gated by said detection signal for controlling said sampling of said received and detected television signal.

20. The receiver of claim 15 wherein said sampling means includes first filter means and wherein said processed synchronizing signal character comprises a first filtered signal having respective high, intermediate and low levels at successive sampling points.

21. The receiver of claim 15 wherein each of said repetitive data segments comprises a plurality of successive multilevel symbols and wherein said synchronizing signal character comprises at least four successive ones of said multilevel symbols, each occurring at one of two predetermined levels.

22. The receiver of claim 21 wherein said two predetermined levels comprise the outermost levels of said multilevel symbols.

23. The receiver of claim 21 wherein the first two of said four successive ones of said multilevel symbols occur at a first of said two predetermined levels and the last two of said four successive ones of said multilevel symbols occur at a second of said two predetermined levels.

24. The receiver of claim 21 wherein said two predetermined levels comprise levels that are between the outermost levels of said multilevel symbols.

25. The receiver of claim 21 wherein the first and fourth of said four successive ones of said multilevel symbols occur at a first of said two predetermined levels and the second and third of said four successive ones of said multilevel symbols occur at a second of said two predetermined levels.

26. The receiver of claim 25 wherein said synchronizing signal character includes a selected DC offset.

27. The receiver of claim 20 wherein said synchronizing signal character includes a selected DC offset and wherein the frequency response of said first filter means is substantially zero at DC.

28. The receiver of claim 20 wherein said sampling means includes second filter means responsive to said synchronizing signal character for developing a second filtered signal having a peak occurring in time coincidence with said intermediate level.

29. The receiver of claim 28 wherein said synchronizing signal character includes a selected DC offset and wherein the frequency responses of both said first filter means and said second filter means are substantially zero at DC.

30. The receiver of claim 28 further including integrating means coupled to the output of said second filter means for reinforcing said second filtered signal.

31. The receiver of claim 30 further comprising means for developing a peak detected signal coupled to said integrating means, for peak detecting said reinforced second filtered signal.

32. The receiver of claim 31 further including confidence counter means responsive to said peak detected signal for generating said detection signal.

33. The receiver of claim 32 wherein said adjusting means comprises phase locked loop means responsive to said detection signal for sampling said first filtered signal to maintain the intermediate level thereof at said selected reference level.

34. The television signal receiver of claim 28 including means for subtracting a predetermined AGC reference level from said second filtered signal for developing a resultant signal and means responsive to said detection signal for accumulating samples of said resultant signal for controlling the amplitude of said received and detected television signal.

35. The receiver of claim 20 wherein said adjusting means comprises phase locked loop means responsive to said detection signal for sampling said first filtered signal to maintain the intermediate level thereof at said selected reference level.

36. The receiver of claim 15 including means responsive to said detected signal for controlling the amplitude of said received and detected television signal.

37. A television signal receiver comprising:
receiving means for receiving a digital television signal comprising repetitive data segments, each including a predetermined synchronizing signal character, each of said data segments comprising a plurality of successive symbols having one of a plurality of levels, said predetermined synchronizing signal character comprising at least four successive symbols occurring at levels between the outermost ones of said plurality of levels;
sampling means for sampling said received television signal;
first filter means responsive to said sampling means for developing a filtered synchronizing signal character having respective high, intermediate and low levels at successive sampling points of said received television signal;
detecting means responsive to said sampling means for generating a detection signal identifying the occurrence of said intermediate level; and
adjusting means responsive to said filtered synchronizing signal character and said detection signal for adjusting the sampling rate of said sampling means for maintaining said intermediate level at a selected reference level.

38. The receiver of claim 37 wherein the first two of said four successive symbols occur at a first predetermined level and the last two of said four successive symbols occur at a second predetermined level.

39. The receiver of claim 37 wherein the first and fourth of said four successive symbols occur at a first predetermined level and the second and third of said four successive symbols occur at a second predetermined level.

40. The receiver of claim 37 wherein said detecting means comprises second filter means for developing a second filtered signal having a peak occurring in time coincidence with said intermediate level, and wherein the frequency responses of said first filter means and said second filter means are both substantially zero at DC.

41. The receiver of claim 37 wherein said adjusting means comprises phase locked loop means responsive to said detection signal for sampling said filtered synchronizing signal character to maintain the intermediate level thereof at said selected reference level.

42. The television signal receiver of claim 37 including means responsive to said detection signal for controlling the amplitude of said received television signal.

43. The receiver of claim 40 wherein said detecting means further comprises integrating means coupled to the output of said second filter means for reinforcing said second filtered signal.

44. The receiver of claim 43 wherein said detecting means further comprises means for peak detecting said reinforced signal.

45. The receiver of claim 44 wherein said detecting means further comprises confidence counter means responsive to said reinforced peak detected signal for generating said detection signal.

46. The receiver of claim 45 wherein said adjusting means further comprises phase locked loop means responsive to said detection signal for sampling said filtered synchronizing signal character to maintain the intermediate level thereof at said selected reference level.

47. The television signal receiver of claim 40 including means for subtracting a predetermined AGC reference level from said second filtered signal for developing a resultant signal and means responsive to said detection signal for accumulating samples of said resultant signal for controlling the amplitude of said received television signal.

48. A television signal receiver comprising:
receiving means for receiving a digital television signal comprising repetitive data segments, each including a predetermined synchronizing signal character;
sampling means for sampling said received television signal;
first filter means responsive to said sampling means for developing a filtered synchronizing signal character having respective high, intermediate and low levels at successive sampling points of said received television signal;
detecting means responsive to said sampling means for generating a detection signal identifying the occurrence of said intermediate level, said detecting means including second filter means for developing a second filtered signal having peak occurring in time coincidence with said intermediate level; and
means responsive to said filtered synchronizing signal character and said detection signal for adjusting the sampling rate of said sampling means for maintaining said intermediate level at a selected reference level.

49. The receiver of claim 48 wherein said predetermined synchronizing signal character includes a selected DC offset and wherein the frequency response of said first filter means and said second filter means are both substantially zero at DC.

50. The receiver of claim 49 wherein said adjusting means further comprises phase locked loop means responsive to said detection signal for sampling said filtered synchronizing signal character to maintain the intermediate level thereof at said selected reference level.

51. The receiver of claim 48 including:
means responsive to said detection signal for controlling the amplitude of said received television signal.

52. The receiver of claim 48 including means for subtracting a predetermined AGC reference level from said second filtered signal for developing a resultant signal and means responsive to said detection signal for accumulating samples of said resultant signal for controlling the gain of said received television signal.

53. A television signal receiver comprising:
means for receiving and detecting a digital television signal having repetitive data segments consisting of multilevel symbols at a fixed rate, each data segment including a synchronizing signal character having four successive symbols with the first and fourth symbols being at one predetermined level and the second and third symbols being at another predetermined level, both said predetermined levels being within the outer levels of said multilevel symbols;
means for sampling said received and detected television signal for developing a processed synchronizing signal character having respective high, intermediate and low levels at successive sampling points of said television signal, and for generating a detection signal identifying the occurrence of said intermediate level; and
means responsive to said processed synchronizing signal character and said detection signal for adjusting the sampling rate of said sampling means for maintaining said intermediate level at a selected reference level.

54. A television signal receiver comprising:
means for receiving and detecting a transmitted digital television signal having repetitive data segments consisting of a plurality of multi-level data symbols, each data segment including a synchronizing signal character consisting of two-level symbols occurring in the same relative position in each of said data segments;
said data symbols having respective outer levels and said two-level synchronizing signal character symbols having respective first and second levels coinciding with respective levels of said data symbols within said outer levels;
means for sampling said received and detected television signal for developing a processed synchronizing signal character having respective high, intermediate and low levels at successive sampling points of said television signal, and for generating a detection signal identifying the occurrence of said intermediate level; and
means responsive to said processed synchronizing signal character and said detection signal for adjusting the sampling rate of said sampling means for maintaining said intermediate level at a selected reference level.

55. A television signal receiver comprising:
receiving means for receiving a digital television signal comprising repetitive data segments, each including a predetermined synchronizing signal character, said data segments including multilevel symbols, said predetermined synchronizing signal character comprising at least four successive two-level symbols occurring at levels between the outermost levels of said multilevel symbols;
sampling means for sampling said received television signal;
filter means responsive to said sampling means for developing a filtered synchronizing signal character having respective high, intermediate and low levels at successive sampling points of said received television signal;
detecting means responsive to said sampling means for generating a detection signal identifying the occurrence of said intermediate level; and
adjusting means responsive to said filtered synchronizing signal character and said detection signal for adjusting the sampling rate of said sampling means for maintaining said intermediate level at a selected reference level.

56. A television signal receiver comprising:
means for receiving and detecting a transmitted digital television signal having repetitive data segments consisting of multilevel data symbols, each data segment including a synchronizing signal character consisting of four successive two-level symbols occurring in the same relative position in each of said data segments; and
said four successive two-level symbols comprising a first symbol occurring at a first level followed by second and third symbols occurring at a second level and a fourth symbol occurring at said first level, both said first and said second levels being between the outermost levels of said multilevel data symbols.

57. The receiver of claim 56, further including:
means for sampling said received and detected television signal for developing a processed synchronizing signal; and
synchronizing means responsive to said processed synchronizing signal character for controlling the sampling rate of said sampling means.

58. A television signal receiver comprising:
receiving means for receiving a digital television signal comprising repetitive data segments, each including a predetermined synchronizing signal character, said data segments including multilevel symbols, said predetermined synchronizing signal character comprising at least four successive two-level symbols occurring at levels between the outermost levels of said multilevel symbols;
sampling means for sampling said received television signal;
filtering means responsive to said sampling means for developing a filtered synchronizing signal character therefrom; and
adjusting means responsive to said filtered synchronizing signal character for controlling the sampling rate of said sampling means.

59. A method of operating a television system having a digital television signal including timing data and video data in a given television channel, said timing data and said video data having zero crossings, comprising selecting a digital timing character having a spectral characteristic that approximates the spectral characteristic of said video data such that distortions introduced by said channel to said timing data and to said video data similarly affect said zero crossings of said video data and of said timing character and therefore do not significantly affect the timing relationship between said timing data and said video data.

60. A television signal receiver comprising:
means for receiving and detecting a transmitted digital television signal having repetitive data segments consisting of multi level data symbols, each data segment including a synchronization signal character consisting of four successive two level symbols occurring in the same relative position in each of said data segments; and
said first and said fourth symbols occurring at one of said levels and said second and said third symbols occurring at the other of said two levels.

61. A television signal receiver comprising means for receiving and detecting a transmitted digital television signal having repetitive data segments consisting of multi level data symbols, each data segment including a synchronizing signal character consisting of four successive two level symbols occurring in the same relative position in each of said data segments; and
said first and said second symbols occurring at one of said two levels and said third and said fourth symbols occurring at the other of said two levels.

62. The receiver of claim 25 wherein said two predetermined levels coincide with respective ones of the levels of the multilevel data symbols.

63. The receiver of claim 39 wherein said first and second predetermined levels coincide with respective ones of the levels of the multilevel data symbols.

64. The receiver of claim 56 wherein said first level and said second level coincide with respective ones of the levels of the multilevel data symbols.

65. The receiver of claim 60 wherein said one level and said other level are between the outermost levels of said multilevel data symbols.

66. The receiver of claim 60 wherein said one level and said other level coincide with respective ones of the levels of the multilevel data symbols.

67. A television signal transmitter comprising:
means for transmitting a digital television signal having repetitive data segments, each consisting of a plurality of multi level data symbols and including a synchronization signal character consisting of four successive two level symbols occurring in the same relative position in each of said data segments; and
said first and said fourth symbols occurring at one level of said two-level symbols and said second and said third symbols occurring at the other level of said two-level symbols.

68. The transmitter of claim 67 wherein said one level and said other level are between the outermost levels of said multilevel data symbols.

69. The transmitter of claim 67 wherein said one level and said other level coincide with respective ones of the levels of the multilevel data symbols.

70. The receiver of claim 56 wherein said first level is greater than said second level.

71. The receiver of claim 60 wherein said one of said levels is greater than said other of said levels.

72. The transmitter of claim 67 wherein said one level is greater than said other level.

* * * * *